United States Patent Office 2,727,901
Patented Dec. 20, 1955

2,727,901

PROCESS FOR PREPARING BICYCLIC HETEROCYCLIC COMPOUNDS

Kenneth L. Kreuz, Fishkill, N. Y., assignor to The Texas Company, New York, N. Y., a corporation of Delaware No Drawing. Original application June 25, 1949, Serial No. 101,486, now Patent No. 2,686,185, dated August 10, 1954. Divided and this application December 15, 1953, Serial No. 398,440

6 Claims. (Cl. 260—319)

This invention relates to the production of heterocyclic compounds containing an aryl group fused to a heterocyclic nucleus. More particularly, this invention relates to a method for producing organic heterocyclic compounds containing a benzo group fused to a heterocyclic nucleus.

The utility and application of heterocyclic compounds, particularly bicyclic heterocyclic compounds wherein an aryl nucleus is fused to a heterocyclic nucleus, in the past have been restricted in scope and have been primarily of academic interest due to the fact that economic and commercial methods of preparation were not available. Recently, heterocyclic compounds, such as furan and pyrrole, have become available. This invention utilizes heterocyclic compounds, such as furan and pyrrole to prepare bicyclic heterocyclics containing at least one benzo group fused to the heterocyclic nucleus. The invention thereby brings a number of bicyclic compounds into the realm of chemicals of commerce.

In accordance with the process of the invention, coumarone and indole compounds are prepared by passing a furan or pyrrole compound, respectively, containing an aliphatic side chain of at least 4 carbon atoms and a substituent selected from the group consisting of hydrogen, hydroxyl, halogen and carboxyl on the delta carbon atom of the side chain and on a nuclear carbon atom adjacent to the side chain, through a reaction zone containing a solid particulate contact catalyst at a temperature between 700 and 1,400° F. The preferred modification of the invention involves passing a furan or pyrrole compound containing an aliphatic hydrocarbon chain of at least 4 carbon atoms in the vapor phase through a reaction zone at a temperature between 1,050 and 1,200° F. in contact with a dehydrogenation catalyst containing a metal or metalloid oxide or sulfide stable under reaction conditions.

The type of fused aryl heterocyclic compound produced by the process of the invention is dependent on the alkyl furan or pyrrole employed as a charge material. Coumarone, also called benzofuran, and its homologs are formed by contacting an alkylated furan derivative containing an aliphatic hydrocarbon chain of at least 4 carbon atoms in the vapor phase with a solid contact catalyst. Dibenzofuran and homologs are prepared by passage of a coumarone homolog containing an aliphatic hydrocarbon chain of at least 4 carbon atoms on the furan ring of the coumarone over a solid contact catalyst at the conditions prescribed in this invention. Indole, also called benzopyrrole, and its homologs are obtained by treating an alkylated pyrrole containing an aliphatic hydrocarbon chain of at least 4 carbon atoms in accordance with the process of the invention. The process of the invention is illustrated by the following equations showing the cyclization of butylfuran and butylpyrrole to coumarone and indole, respectively.

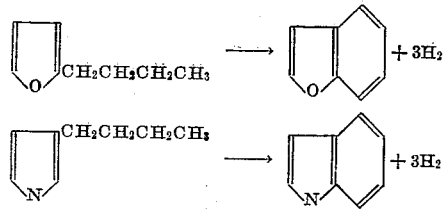

In general, furan and pyrrole compounds containing an aliphatic side chain of at least four carbon atoms may be employed as the organic reactant. There appears to be no limit on the chain length of the aliphatic group attached to the heterocyclic nucleus with the exception that the alkylated heterocyclic should be in the vapor form under reaction conditions. Coumarone, indole and homologs thereof containing alkyl groups attached to the benzo group are obtained by cyclization of a heterocyclic compound containing an aliphatic chain of more than 4 carbon atoms, since the cyclization reaction is accompanied by alkyl transfer. When relatively simple reaction products are desired, it is advisable to employ a charge stock comprising an alkylated furan or pyrrole compound containing an aliphatic side chain of four to six carbon atoms.

A further requirement on the charge stock employed in the process of this invention is that both the carbon atom of the heterocyclic nucleus adjacent to the aliphatic side chain and the delta-carbon atom of the aliphatic chain contain a hydrogen atom or a thermally labile constituent, such as a halogen atom or a hydroxy group. The formation of a fused benzo heterocyclic compound wherein a benzo nucleus and a heterocyclic nucleus share two carbon atoms necessitates the presence on these carbon atoms of an atom or group which is readily removed during the cyclization reaction. A preferred charge to the cyclization reaction of this invention contains a hydrogen atom on both the nuclear carbon alpha to the aliphatic side chain and on the delta-carbon of the aliphatic chain. However, the cyclization process of this invention is operable when halogens, hydroxyl and carboxyl groups are present on these carbon atoms.

The process also includes the use of substituted heterocyclic compounds containing an aliphatic side chain of at least four carbon atoms. These compounds comprise substituted heterocyclics containing an aliphatic chain of at least four carbon atoms in which the substituents either remain attached to the nucleus or side chain during the reaction or are removed during the reaction to form compounds which do not have a substantially adverse effect on the cyclization. The substituents may be attached either to the heterocyclic nucleus or to the alkyl group of charge material. Examples of such substituted alkylated heterocyclic hydrocarbons are halogenated compounds, such as 2-n-butyl-5-chloro furan and hydroxy derivatives, such as 4-(2-furyl) normal butyl alcohol. In substituted alkylated heterocyclic compounds employed for the process of this invention, the main requirements are that both the delta-carbon atom in the alkyl group and nuclear carbon atom adjacent to the alkyl group contain a hydrogen atom or readily replaceable group, and that the compound be vaporizable under conditions of reaction.

The heterocyclization reaction of the invention is conducted in the presence of a solid contact catalyst which may be described chemically as a solid contact material of the class of oxides and sulfides which are stable under reaction conditions. Such catalysts include metal oxides, such as molybdena, which, under the conditions of reaction, may undergo conversion to the corresponding sulfide. It is recognized that certain of the materials classified as catalysts for the subject reaction are really inert catalytically as applied to conventional hydrocarbon conversion reactions. Selection of the particular catalyst to be used depends to a large extent upon the choice of charge stock used in the reaction. The solid contact catalysts usually preferred for general application with alkylated aromatic charge stocks are the solid acid-reacting catalysts, such as amphoteric metal oxides and sulfides which are stable under reaction conditions, such as silica, alumina, etc.

Specific examples of catalysts contemplated for use in the invention are oxides of aluminum, chromium, vanadium, molybdenum, titanium, magnesium, boron, silicon and sulfides of iron, nickel, cobalt, tungsten, tin, etc., as well as mixtures and chemical combinations thereof, such as silica-alumina, acid-treated bentonitic clays, etc.

The familiar class of dehydrogenation catalysts is included within the general classification of solid acid-reacting contact catalysts and are preferred catalysts for the process of this invention. Suitable dehydrogenation catalysts are the oxides and stable sulfides of the metals of group VI$b$ of the periodic table. Specifically preferred dehydrogenation catalysts are chromia-alumina, molybdena-alumina and silica-chromia-alumina.

In carrying out the process of the invention, the reactants in vapor form are introduced into a reaction chamber containing a solid contact catalyst maintained at the desired reaction temperature. The catalytic reaction zone may be either a fixed bed type or a fluid type, in which latter type operation the catalyst is maintained in powder form in a turbulent state.

It is evident that the process may be operated in accordance with any of the usual techniques for high temperature catalytic conversions. Thus, fixed catalyst beds may be used in alternate reaction and regeneration cycles; fluid catalyst operation may be used wherein catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalyst beds as well as moving catalyst beds of the Thermofor type are other possible alternatives.

It will be recognized that the conditions of cyclization will vary in accordance with the particular reactant and catalyst employed as well as the type of process technique. As a general proposition, however, a temperature between 700 and 1400° F. and a space velocity of about 0.3 to 10, wherein space velocity defines the weights of hydrocarbons per hour per weight of catalyst are preferred in the majority of reactions.

The process of the present invention, using the prescribed catalysts and particularly dehydrogenation catalysts, such as the oxides and sulfides of metals of group VI of the periodic table, is readily adaptable to commercial operation because the reaction proceeds at economically feasible space velocities. The required contact time of charge material with the catalyst is low and is of the order of 0.1 to 4 seconds. When employing chromia-alumina or molybdena-alumina catalysts, the cyclization of alkylated heterocyclic compounds, in which the alkyl group contains at least four carbon atoms, is advantageously effected at a space velocity within the range of one to five. At such space velocities, the capacity of a commercial unit is of reasonable magnitude to support commercial development.

Particular conditions of reaction are best illustrated by reference to the conditions involved in contacting an alkylated heterocyclic compound such as 2-butenyl furan with a dehydrogenation catalyst such as silica-chromia-alumina employing a fixed-bed type of process technique. In passing butenyl furan over silica-chromia-alumina catalyst, the space velocity advantageously falls within the range of 1.0 to 5.0. The temperature in the catalyst zone is maintained between 900 and 1,400° F. and preferably between 1,050 and 1,250° F. and a contact time of 0.5 to 2 seconds is used. It is to be understood that the specific conditions described as optimum are those which result in an optimum yield of coumarone from butenyl furan in a single pass. Where a continuous recycle process is used, it may be desirable to modify these preferred conditions of reaction in order to obtain ultimate yield of desired product.

The process period for optimum production of coumarone and indole compounds will depend to some extent upon the charge stock and reaction conditions employed, but will generally be about one hour. In any case, periodic determination of the yield of bicycle heterocyclic will indicate the practical period of catalyst use without regeneration. When the yield of bicyclic heterocyclic derivatives is found to fall off sharply, the catalyst may be regenerated by conventional methods, such as regeneration with air at about 1,000° F., which methods are typical of the type of catalyst employed.

Fused bicyclic heterocyclic compounds produced by the reaction may be recovered from the reaction product in accordance with conventional methods of recovery. For example, the coumarone-containing reaction product obtained by cyclization of butenyl furan and containing unreacted charge stock and cracked products of charge stock is passed through a caustic soda solution to dissolve any acid gases formed during the reaction. If the caustic soda solution is maintained cold, coumarone will condense as a supernatant layer which can be drawn off therefrom and distilled. If the caustic soda solution is maintained hot, coumarone will steam distill therefrom and can then be separated from the water layer and purified by distillation.

The fused cyclic coumarone or indole products of reaction may also be recovered in crude form by a simple condensation procedure using water-cooled condensers or the products may be passed into a cool body of hydrocarbon oil such as diesel fuel or furnace oil having an initial boiling point above 450° F. in which the bicyclic heterocyclic compounds condense; bicyclic heterocyclic compounds can later be recovered from the condensing oil by distillation.

The process of the invention may be further illustrated by the following specific examples.

*Example I*

2-butenyl furan is preheated to approximately the reaction temperature and charged to a catalytic fixed bed reaction chamber maintained at an average temperature of 1,110° F. and atmospheric pressure. The reaction chamber contains a pelleted catalyst which consists of a mixture of chromic oxide, silica and alumina having the approximate composition of 10 per cent $Cr_2O_3$, 5 per cent $SiO_2$ and 85 per cent $Al_2O_3$. The reactant is charged at a space velocity of approximately 2.5 weights of butenyl furan per hour per weight of catalyst. The catalyst is maintained on stream for a period of about 34 minutes without reactivation. Crude coumarone of about 95 per cent purity is obtained in a yield of about 23 pounds per hundred pounds of butenyl furan charged.

*Example II*

2-butenyl furan is preheated to approximately the reaction temperature and charged to a catalytic fixed bed reaction chamber maintained at an average temperature of 1,125° F. and atmospheric pressure. The reaction chamber contains pelleted catalyst which consists of kieselguhr impregnated with $P_2O_5$ and commercially sold as UOP No. 1. The reactant is charged to the reaction chamber at a space velocity of approximately 2.0 weights of butenyl furan per hour per weight of catalyst. Catalyst is maintained on stream for a period of about 24 minutes without reactivation. Crude coumarone of about 95 per cent purity is obtained in a yield of about 30.0 pounds per hundred pounds of butenyl furan charged.

*Example III*

3-n-butyl pyrrole is preheated to approximately reaction temperature and charged to a catalytic fixed bed reaction chamber maintained at an average temperature of about 1,075° F. and atmospheric pressure. The reaction chamber is filled with a pelleted catalyst consisting of a mixture of 15 per cent $Cr_2O_3$ and 85 per cent $Al_2O_3$. The butyl pyrrole is charged to the reactor at a space velocity of approximately 1.9 weights per hour per weight of catalyst. The catalyst is maintained on stream for a period of about 35 minutes without reactivation. Crude indole of about 92 per cent purity is obtained in a yield of about 25.3 pounds per hundred pounds of butyl pyrrole charged.

It will be understood, of course, that these examples are merely illustrative of the preferred embodiment of the invention and that other catalysts, charge stocks and conditions of reaction may be employed in accordance with the previous disclosure. Homologs of coumarone and indole are prepared from alkylated pyrrole and furan wherein the aliphatic side chain contains more than four carbon atoms.

This application is a division of our copending application Serial No. 101,486 filed June 25, 1949, now Patent No. 2,686,185 issued August 10, 1954.

Obviously, many modifications and variations of the invention as set forth above may be made without departing from the spirit and scope thereof and, therefore, only such limitations should be imposed as are indicated in the appended claims.

I claim:

1. A process for the production of coumarone and indole heterocyclic compounds which comprises passing a heterocyclic compound selected from the group consisting of furan and pyrrole which contain an aliphatic side chain of at least four carbon atoms and a substituent selected from the group consisting of hydrogen, hydroxyl, halogen and carboxyl on the delta carbon atom of the side chain and on a nuclear carbon atom adjacent to the side chain, through a reaction zone in the vapor phase at a temperature between 700 and 1,400° F. in contact with a catalyst comprising mainly a compound selected from the group consisting of metal oxides and sulfides and metalloid oxides and sulfides stable under reaction conditions and mixtures thereof, removing from said reaction zone a reaction product and recovering from said reaction product a heterocyclic compound containing a fused benzo nucleus.

2. A process according to claim 1 in which the temperature is maintained between 1,050 and 1,200° F.

3. A process according to claim 1 in which the aliphatic side chain is a hydrocarbon radical.

4. A process according to claim 1 in which the catalyst comprises chromic oxide supported on a surface-active material.

5. A process according to claim 1 in which the catalyst is kieselguhr impregnated with $P_2O_5$.

6. A process according to claim 1 in which the catalyst is molybdenum oxide supported on a surface-active material.

References Cited in the file of this patent

UNITED STATES PATENTS 2,686,185   Kreuz _____ Aug. 10, 1954

FOREIGN PATENTS 641,944   Great Britain _____ Aug. 9, 1950

OTHER REFERENCES

Jackson et al.: Jour. Am. Chem. Soc., vol. 52, pp. 5029–30 (1930).